United States Patent [19]
Irmscher et al.

[11] Patent Number: 4,787,186
[45] Date of Patent: * Nov. 29, 1988

[54] COMBINATION FOR SECURING AN ANCHOR MEMBER

[75] Inventors: Hans-Jürgen Irmscher, Emmering; Ludwig Gebauer; Gusztav Lang, both of Munich; Peter Mauthe, Kleinberghofen, all of Fed. Rep. of Germany

[73] Assignee: Hilti Aktiengesellschaft, Schaan, Liechtenstein

[*] Notice: The portion of the term of this patent subsequent to May 29, 2005 has been disclaimed.

[21] Appl. No.: 563,662

[22] Filed: Dec. 20, 1983

[30] Foreign Application Priority Data

Dec. 21, 1982 [DE] Fed. Rep. of Germany ....... 3247227

[51] Int. Cl.$^4$ .......................... E04C 1/00; E04C 5/00; E21D 20/02; E04B 1/38
[52] U.S. Cl. ..................................... 52/309.3; 52/698; 405/260
[58] Field of Search ................ 52/309.3, 698; 405/260

[56] References Cited

U.S. PATENT DOCUMENTS

| | | | |
|---|---|---|---|
| 3,837,258 | 9/1974 | Williams | 405/260 X |
| 4,126,009 | 11/1978 | Tomic | 405/260 |
| 4,193,246 | 3/1980 | Schiefer et al. | 52/698 |
| 4,305,687 | 12/1981 | Parker | 405/260 |

Primary Examiner—Michael R. Lusignan
Attorney, Agent, or Firm—Toren, McGeady & Associates

[57] ABSTRACT

A combination for securing an anchor member in a receiving material includes a hardenable reaction resin mortar containing filler material and a sleeve-like dowel member with openings extending through the dowel member wall so that mortar injected into the dowel member can escape laterally outwardly through the openings. The ratio of the diameter of the openings through the dowel member wall to the mean particle diameter with the filler material is in the range of approximately 1.5 to 12.0, and particularly 1.8 to 5.6.

25 Claims, 1 Drawing Sheet

COMBINATION FOR SECURING AN ANCHOR MEMBER

SUMMARY OF THE INVENTION

The present invention is directed to a combination for securing anchor members, such as anchor rods and the like, in hard receiving materials, and includes a hardenable reaction resin mortar containing a filler material and a sleeve-like dowel member serving to receive the mortar with openings through the dowel wall so that the mortar can flow through the openings. Further, the dowel member is arranged to receive and secure the anchor member. In practice, such anchor members are included in the type designated as injection systems.

It has long been known to use mortar with an organic or inorganic base for securing anchor members in boreholes of a hard receiving material. To assure that the mortar penetrates completely into all parts of the borehole, a certain minimum flowability for the mortar is a necessary requirement. Providing such flowability usually results in difficulties. If the receiving material contains fissures or cavities, such as in natural rock or in hollow wall masonry, there is the danger that the mortar will run into the gaps, fissures or hollow spaces with the result that the mortar required for securing the anchor member will not be available. Another problem is that the mortar tends to flow out of horizontal boreholes and to a greater degree out of boreholes extending vertically upwardly. To counteract such difficulties it has been attempted to use a sleeve-like dowel member with a screen-like wall or with holes through the wall with the mortar being filled into the dowel member after it is inserted into a borehole. The use of such a dowel member was intended to prevent the mortar from running out of the borehole. In practice, however, it has been found that such an arrangement does not have sufficient strength and has proved to be impractical.

Therefore, it is the primary object of the present invention to provide a combination for securing an anchor member in a receiving material so that the problems and difficulties experienced in the past are overcome.

In accordance with the present invention, a combination is provided for securing an anchor member, such as an anchor rod or the like, in a hard receiving material, such as in hollow wall masonry. The combination includes a hardenable reaction resin mortar containing filler material and a sleeve-like dowel member having openings through the dowel wall so that the mortar injected into the dowel member can pass laterally outwardly through the openings. It has been found in a surprising manner that the disadvantages experienced in the past can be overcome if the filler material in the reaction resin mortar has a mean particle diameter in the range of 0.01 to 0.5 mm and if the ratio of the diameter of the openings through the dowel member wall to the diameter of the filler material in the mortar is approximately in the range of 1.5 to 12.0, and more particularly in the range of 1.8 to 5.6. Preferably, the filler material has a mean particle diameter in the range of 0.05 to 0.3 mm.

Surprisingly it has been found that the uncontrolled running of the reaction resin mortar is counteracted in a very satisfactory manner when the above parameters are observed. Furthermore, the filtration effect experienced in the past, where the reaction resin mortar located outside the sleeve-like dowel member has a different composition than the mortar inside the dowel member, no longer occurs. With the present invention, a homogeneous composition of mortar is ensured both inside and outside of the sleeve-like dowel body. Such a homogeneous composition is of substantial importance for the strength of the anchor member. Moreover, a quantity of the reaction resin mortar of homogeneous composition, which quantity is sufficient for assuring the desired strength of the anchor member can flow through the openings in the sleeve-like dowel body in a controlled manner in accordance with the present invention.

The diameter of the openings through the dowel member wall is in the range of 0.1 to 5 mm, though the preferred range is 0.3 to 3 mm and, in particular, the range is 0.5 to 0.8 mm. The combination has proved to be particularly successful if, with the sleeve-like dowel member formed by a screen sleeve, the ratio of the diameter of the openings to the smallest web remaining between two adjacent openings is approximately in the range of 1.4 to 6.25 mm, and preferably approximately 1.6 mm. Such a construction of the sleeve-like dowel member has the particular advantage that the individual streams of reaction resin mortar passing outwardly through the openings subsequently combine outwardly to form a mass.

Moreover, it has proved to be particularly successful when the filler material in the reaction resin mortar is formed of hollow bodies, particularly hollow balls formed of mineral material. Such hollow bodies preferably have a density of approximately 0.3 to 0.8 g/cm$^3$. Hollow bodies or hollow balls formed of glass, corundum or ceramic materials have been found to be very effective and hollow balls formed of a plastics material can also be used as the filler material. The filler material has a mean particle diameter in the range of approximately 0.01 to 0.5 and, more particularly, in the range of approximately 0.05 to 0.3 mm. At least 60% of the filler material particles have a diameter within the range indicated and preferably 80% and, in particular, 90% of the particles fall within the indicated ranges. The use of filler material of a relatively low specific weight has the advantage that such material ensures the radial distribution of the reaction resin mortar passing through the openings in the sleeve-like dowel member substantially independent of the force of gravity. Such a flow of the mortar out of the sleeve-like dowel member takes place in substantially equal quantities all around the dowel body and is of substantial importance for achieving a high strength anchor. Especially good results are achieved if the ratio of the density of the filler material particles to the density of the resin portion of the mortar is approximately in the range of 0.25 to 0.9 and, more particularly, in the range of 0.6 to 0.8.

Further, it has proved to be advantageous if the viscosity of the reaction resin mortar containing the filler material is in the range of 50 to 300 and especially in the range of 80 to 300 Pa.s. The various ways of influencing viscosity in reaction resin mortars are known to persons skilled in the art. For example, the viscosity can be controlled by the filler material content. Reaction resin mortars with a filler material content between 25-45 volume-%, as referred to the total volume of the reaction resin mortar, have proved to be particularly successful in accordance with the present invention. Such a filler material content corresponds to approximately 5-35 weight-%. Another way of regulating viscosity which has proved to be particularly successful in the present invention involves the addition of thixotropic agents. To obtain the desirable viscosity, which is particularly useful in the present invention, known materials, such as pyrogenic silicic acid as well as kaolin, asbestos, montmorillonite and similar compounds can be used. Thixotropic agents, in particular, pyrogenic silicic acid, have proved to be especially successful in the range of 1 to 8 weight-% and, more particularly, in the range of 4 to 6 weight-% with respect to the total amount of the reaction resin mortar.

The flow limit of the mortar is usually located between 500-1200 Pa, and in particular between 800-1000 Pa.

Reaction resin mortars with a density below 1.5 g/cm$^3$, preferably below 1.4 g/cm$^3$ and in particular below 1.0 g/cm$^3$, have proved to be successful to a great extent. Lower densities of the reaction resin mortar are especially desirable for obvious reasons, that is, for obtaining the most uniform possible radial discharge from the sleeve-like dowel member.

Suitable reaction resin mortars are described in the German patent publication No. P 32 26 602.2. A mortar of the following composition has also proved to be especially useful:

Unsaturated polyester resin: 24-58 weight-%
Reactive diluting agent: 14-38 weight-%
Filler material hollow balls: 17-34 weight-%
Peroxide hardener: 1-4 weight-%
Softener (emollient): 1-7 weight-%
Thixotropic agent: 1-8 weight-%

In particular the following mortar composition has been successful:

Unsaturated polyester: 35-37 weight-%
Monostyrene: 25-28 weight-%
Glass hollow balls (0.06-0.2 mm): 24-27 weight-%
Dibenzoyl peroxide: 2-3 weight-%
Phthalate softener: 3-7 weight-%
Pyrogenic silicic acid: 4-6 weight-%

The combination for securing an anchor member in accordance with the present invention is especially effective in hollow wall masonry. The anchor member is secured in the usual manner. Initially, the sleeve-like dowel member is inserted into a borehole and then the reaction resin mortar mixture is injected into the dowel member utilizing a hand actuated injection device. The anchor member, such an anchor bar, is inserted into the dowel member usually by turning the anchor member. The part of the anchor member used for anchoring or securing another member can be a threaded bar or a square, triangularly shaped or conically shaped member where the conically shaped member has a cone angle of about 2°-3°. The following example is exemplary of the present invention.

EXAMPLE

For securing an anchor member in hollow wall masonry a combination is used where the mortar based on unsaturated polyester has the following composition:

| | |
|---|---|
| Unsaturated polyester | 36.5 weight % |
| Monostyrene | 26.0 weight % |
| Glass hollow balls (0.1 mm) | 27.0 weight % |
| Dibenzoyl peroxide | 2.2 weight % |
| Dioctyl phthalate | 4.2 weight % |
| Pyrogenic silicic acid | 4.1 weight % |
| | 100.0 weight % |

| | |
|---|---|
| Gelling time $t_{gel}$ | 5-7 min. |
| Viscosity | 260 ± 30 Pa·s |
| Liquid limit | 950 ± 50 Pa |
| Density | 0.85 g/cm$^3$ |

The preparation of the mortar is effected by means of a two-component cartridge where the above composition is divided into two components. The volume distribution of the components is 9.3 parts of the resin component and one part of the hardener component. The individual components in the cartridge have the following compositions:

| RESIN COMPONENT | |
|---|---|
| Unsaturated polyester | 40.3 weight % |
| Monostyrene | 28.7 weight % |
| Glass hollow balls | 26.9 weight % |
| Pyrogenic silicic acid (Aerosil 200) | 4.1 weight % |

| HARDENER COMPONENT | |
|---|---|
| Dibenzoyl peroxide | 23.2 weight % |
| Dioctyl phthalate | 44.2 weight % |
| Glass hollow balls | 28.4 weight % |
| Pyrogenic silicic acid (Aerosil 200) | 4.2 weight % |

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
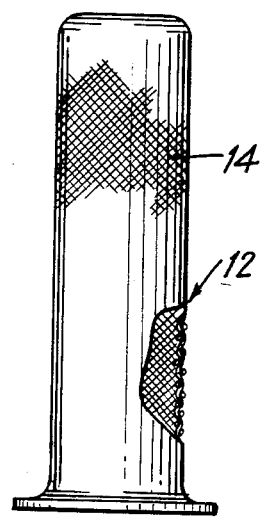
FIG. 1 is an elevation view of a sleeve-like dowel member used in the present invention.
Figure 2:
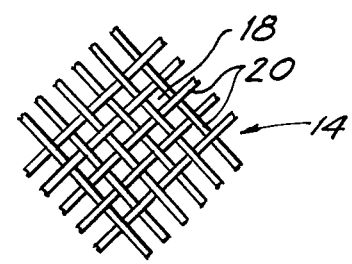
FIG. 2 is an enlarged view of a portion of the screen-like wall forming the dowel member in FIG. 1.
Figure 3:
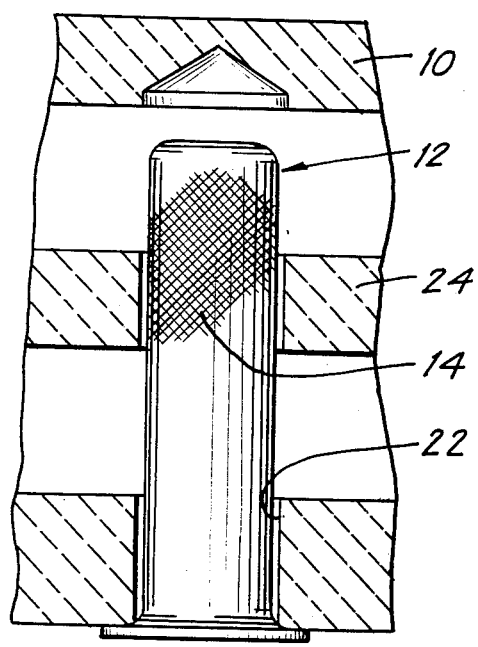
FIG. 3 is a sectional view of a borehole in a receiving material with the dowel member of FIG. 1 inserted into the borehole.
Figure 4:
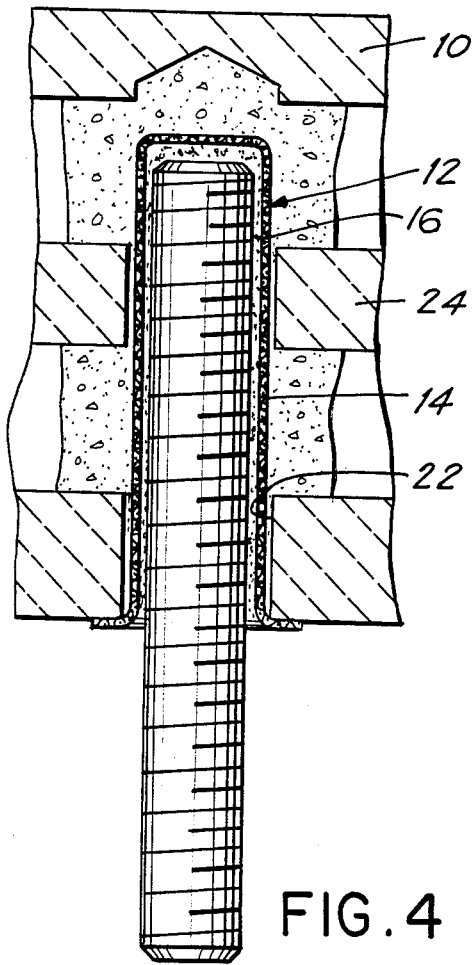
FIG. 4 is a view similar to FIG. 3 with a reaction resin mortar partially injected into the sleeve-like dowel member in FIG. 3.

As shown in FIGS. 3 and 4, in accordance with the present invention, a combination for securing an anchor member in hollow wall masonry 10 includes a sleeve-like dowel member 12 formed with a cylindrically shaped screen-like wall 14. A hardenable reaction resin mortar 16 is injected into the interior of the dowel member 12 so that it flows laterally outwardly through the openings 18 formed in the screen-like wall 14 with the openings defined by separating webs 20.

Initially a borehole 22 with a diameter of 16 mm and a depth of 100 mm is formed in hollow wall brick 24. The sleevelike dowel member 12 having a diameter of 15 mm and an axial length of 90 mm is inserted into the borehole 22. The screen-like wall 14 of the dowel member has openings 18 with a diameter or dimension between opposite sides of 0.4 mm and a width of the webs 20 of 0.25 mm.

With the dowel member 12 inserted into the borehole 22, the mortar 16 is injected from a conventional hand-operated injection device into the interior of the dowel member. The injection device, not shown, delivers the mortar from a two-component cartridge. The two components are injected through separate lines into a filling member or nozzle for delivering the mortar into the dowel member. The two components are mixed homogeneously by a mixer located in the nozzle. The quantity and injection of the mortar 16 is effected in a strokewise manner. Initially, the nozzle of the injection device is inserted for a depth of 80 mm into the dowel sleeve and 8–10 cm$^3$ of mortar 16 is injected in the first step or stroke of the mortar injection. After the first stroke is completed, the injection device is withdrawn for approximately 15 mm and another quantity of the mortar is injected as described above. A total of six steps or strokes are performed during the process of entirely filling the dowel member. During the injection operation, a part of the mortar flows into the hollow chambers in the hollow brick passing outwardly from the interior of the dowel member through the openings 18 formed between the webs 20 of the screen-like wall 14. Due to the characteristic of the mortar containing the hollow balls of filler material, a uniform radial distribution is effected based on the ratio of the filler material diameter to the size or diameter of the openings in the mesh or screen-like wall. Further, the mortar adheres to the sleeve-like dowel member and uncontrolled flow of the mortar is prevented.

With the dowel member 12 within the borehole 22 filled with the mortar 16, an anchor member, such as a threaded bar M 12, not shown, is inserted into the sleeve-like dowel member. The mortar present within the dowel member is displaced laterally outwardly flowing radially through the openings in the screen-like wall 14 and providing a form-locking securement of the anchor member.

As a rule, the level of the strength of the anchor is determined by the strength of the material in which the anchor is set. In HLZ type 12 hollow bricks (minimum compressive strength 12 N/mm$^2$) the failure value with central tension is 7–9 kN (with the cause of failure being failure of the receiving material).

While specific embodiments of the invention have been shown and described in detail to illustrate the application of the inventive principles, it will be understood that the invention may be embodied otherwise without departing from such principles.

We claim:

1. A combination for securing an anchor member, such as an anchor rod, in a hard receiving material, comprising a hardenable reaction resin mortar containing filler material, and an axially elongated sleeve-shaped screen-like wall forming an axially extending dowel member having openings along the axial length thereof and extending through said wall transversely of the axial direction of said dowel member and said dowel member serving to receive said mortar so that said mortar flows outwardly through the openings and said dowel member containing said mortar arranged to receive and secure the anchor member, wherein the improvement comprises that said filler material in said mortar has a mean particle diameter in the range of 0.01 to 0.5 mm, and the ratio of the diameter of said openings through said dowel member to the mean particle diameter of said filler material is in the range of approximately 1.5 to 12.0 so that said filler material passes through said openings.

2. A combination, as set forth in claim 1, wherein the ratio of the diameter of said openings through said dowel member to the mean particle diameter of said filler material is in the range of approximately 1.8 to 5.6.

3. A combination, as set forth in claim 1, wherein the diameter of said openings is in the range of 0.1 to 5 mm.

4. A combination, as set forth in claim 3, wherein the diameter of said openings is in the range of 0.3 to 3 mm.

5. A combination, as set forth in claim 3, wherein the diameter of said openings is in the range of 0.5 to 0.8 mm.

6. A combination, as set forth in claim 1 or 3, wherein the ratio of the diameter of said openings through said dowel member to the least web thickness remaining between two adjacent said openings is in the range of approximately 1.4 to 6.25.

7. A combination, as set forth in claim 6, wherein the ratio of the diameter of said openings through said dowel member to the least web thickness between two adjacent said openings is approximately 1.6.

8. A combination, as set forth in claim 1 or 3, wherein said filler material comprises hollow balls.

9. A combination, as set forth in claim 8, wherein said hollow balls are formed of a mineral type material and have a density of approximately 0.3 to 0.8 g/cm$^3$.

10. A combination, as set forth in claim 9, wherein the density of said hollow balls is in the range of 0.6 to 0.8 g/cm$^3$.

11. A combination, as set forth in claim 1 or 3, wherein the density of the filler material particles to the density of the resin portion of said reaction resin mortar is in the range of approximately 0.25 to 0.9.

12. A combination, as set forth in claim 11, wherein the density of the filler material particles to the density of the resin portion of said reaction resin mortar is in the range of approximately 0.6 to 0.8.

13. A combination, as set forth in claim 1 or 3, wherein the viscosity of said reaction resin mortar containing filler material is in the range of 50 to 300 Pa.s.

14. A combination, as set forth in claim 1 or 3, wherein the viscosity of said reaction resin mortar containing filler material is in the range of 80 to 300 Pa.s.

15. A combination, as set forth in claim 1 or 3, wherein the content of said filler material in said reaction resin mortar is in the range of approximately 25 to 45 volume % with reference to the total volume of said reaction resin mortar.

16. A combination, as set forth in claim 1 or 3, wherein at least one thixotropic agent is included in said reaction resin mortar in a quantity in the range of 1 to 8 weight-% with respect to the total quantity of said reaction resin mortar.

17. A combination, as set forth in claim 1 or 3, wherein at least one thixotropic agent is included in said reaction resin mortar in a quantity in the range of 4 to 6 weight-% with respect to the total quantity of said reaction resin mortar.

18. A combination, as set forth in claim 1 or 3, wherein the flow limit of said reaction resin mortar is in the range of 500 to 1200 Pa.

19. A combination, as set forth in claim 18, wherein said flow limit of said reaction resin mortar is in the range of 800 to 1000 Pa.

20. A combination, as set forth in claim 1 or 3, wherein the density of said reaction resin mortar is less than 1.5 g/cm$^3$.

21. A combination, as set forth in claim 20, wherein the density of said reaction resin mortar is less than 1.4 g/cm$^3$.

22. A combination, as set forth in claim 20, wherein the density of said reaction resin mortar is less than 1.0 g/cm$^3$.

23. A combination, as set forth in claim 8, wherein said reaction resin mortar has the following composition:
   Unsaturated polyester resin: 24–58 weight-%
   Reactive diluting agent: 14–38 Weight-%
   Filler material hollow balls: 17–34 weight-%
   Peroxide hardener: 1–4 weight-%
   Softener: 1–7 weight-%
   Thixotropic agent: 1–8 weight-%

24. A combination, as set forth in claim 8, wherein said filler material in said reaction resin mortar comprises hollow glass balls and said reaction resin mortar has the following composition:
   Unsaturated polyester: 35–37 weight-%
   Monostyrene: 25–28 weight-%
   Glass hollow balls (0.06–0.2 mm): 24–27 weight-%
   Dibenzoyl peroxide: 2–3 weight-%
   Phthalate softener: 3–7 weight-%
   Pyrogenic silicic acid: 4–6 weight-%

25. A combination, as set forth in claim 1 or 3, wherein hollow wall masonry forms the receiving material within which said dowel member is secured.

* * * * *